(12) United States Patent
Zhu et al.

(10) Patent No.: US 12,198,571 B2
(45) Date of Patent: Jan. 14, 2025

(54) INTEGRATED TEACHING SYSTEM FOR INTERACTION AND EXAMINATION OF EAR ACUPOINTS

(71) Applicant: Hunan Academy of Chinese Medicine, Changsha (CN)

(72) Inventors: Haili Zhu, Changsha (CN); Yan Chen, Changsha (CN); Weihong Tang, Changsha (CN); Hongkun Cai, Changsha (CN)

(73) Assignee: Hunan Academy of Chinese Medicine, Changsha (CN)

( * ) Notice: Subject to any disclaimer, the term of this patent is extended or adjusted under 35 U.S.C. 154(b) by 193 days.

(21) Appl. No.: 18/120,396

(22) Filed: Mar. 12, 2023

(65) Prior Publication Data
US 2023/0335012 A1 Oct. 19, 2023

(30) Foreign Application Priority Data

Apr. 13, 2022 (CN) .......................... 202210387096.6

(51) Int. Cl.
*G09B 23/30* (2006.01)
*G09B 5/06* (2006.01)

(52) U.S. Cl.
CPC ............... *G09B 23/30* (2013.01); *G09B 5/06* (2013.01)

(58) Field of Classification Search
None
See application file for complete search history.

(56) References Cited

FOREIGN PATENT DOCUMENTS

| CN | 106683494 A | * | 5/2017 | ............... G09B 1/08 |
| CN | 113112897 A | * | 7/2021 | ............. G09B 23/28 |

OTHER PUBLICATIONS

CNIPA, Notification of a First Office Action for CN202210387096.6, Mar. 17, 2023.
Hunan Province Traditional Chinese Medicine Research Institute (Applicant), Replacement claims (allowed) of CN202210387096.6, Apr. 4, 2023.
CNIPA, Notification to grant patent right for invention in CN202210387096.6, Jun. 5, 2023.

\* cited by examiner

*Primary Examiner* — James B Hull
(74) *Attorney, Agent, or Firm* — Hemisphere Law, PLLC; Zhigang Ma (57) ABSTRACT

An integrated teaching system for interaction and examination of ear acupoints includes a placement table, and a mounting plate rotatably mounted on the placement table by a first connecting shaft. Two ear acupoint models are symmetrically mounted on two sides of the mounting plate, respectively. The system further includes a support frame and a second connecting shaft fixed on the support frame, the second connecting shaft is connected to the first connecting shaft by a gear set, the second connecting shaft is rotatably connected to a mounting frame fixed on the placement table, an end of the support frame away from the placement table is inserted into a fixing sleeve and is slidable along the fixing sleeve, a lifting drive part is disposed in the support frame and connected to the fixing sleeve, and the lifting drive part is connected to the mounting frame by a transmission part.

7 Claims, 7 Drawing Sheets

INTEGRATED TEACHING SYSTEM FOR INTERACTION AND EXAMINATION OF EAR ACUPOINTS

TECHNICAL FIELD

The disclosure relates to the technical field of teaching, and particularly to an integrated teaching system for interaction and examination of ear acupoints.

BACKGROUND

Ear is an important information receiving organ of the human body. Traditional Chinese medicine thinks that although the ear is small, there are hundreds of acupoints for disease prevention and treatment. These acupoints are closely related to the health of the human body since they are connected with the meridians of the whole human body.

Therefore, stimulating the ear acupoints with a correct method can promote the blood circulation of the ear and achieve a good conditioning effect on body diseases. A map of the ear acupoints is helpful to find the ear acupoints accurately and get rid of the disease.

Since many acupoints are arranged on the ear, it is difficult for medical staff to clearly grasp the above acupoints and accurately point out corresponding positions of the ear acupoints. An existing teaching system of ear acupoints is only a simple model of ear acupoints, which requires the medical staff to learn by rote, and the teaching effect is poor.

SUMMARY

A purpose of the disclosure is to provide an integrated teaching system for interaction and examination of ear acupoints, for solving the problem in the background.

To achieve the above purpose, technical solutions provided by the disclosure are as follows.

An integrated teaching system for interaction and examination of ear acupoints includes:

a placement table and a mounting plate rotatably mounted on the placement table by a first connecting shaft, and two ear acupoint models are symmetrically mounted on two sides of the mounting plate.

The integrated teaching system further includes a support frame and a second connecting shaft fixed on the support frame, the second connecting shaft is connected to the first connecting shaft by a gear set, the second connecting shaft is rotatably connected to a mounting frame fixed on the placement table, an end of the support frame away from the placement table is inserted into a fixing sleeve and is slidable along the fixing sleeve, a lifting drive part is disposed in the support frame and is connected to the fixing sleeve, and the lifting drive part is connected to the mounting frame by a transmission part.

Each of the two ear acupoint model is provided with seventy-nine acupoint blocks, an inner side of each of the acupoint blocks is embedded with an indicator lamp, the indicator lamp is connected to a control system disposed on the mounting plate, and the control system is configured to establish communication with an operation panel disposed on the placement table.

In the integrated teaching system for interaction and examination of ear acupoints, the control system includes a central processing unit, trigger modules, a communication module, a voice acquisition module and a voice broadcast module. Specifically, the trigger modules are integrated on the acupoint blocks respectively and are connected to the central processing unit, and each of the trigger modules is configured to be started and send trigger information to the central processing unit when pressing a corresponding one of the acupoint blocks manually.

The central processing unit is configured to receive the trigger information and issue instructions to the indicator lamp and the voice broadcast module according to the trigger information, to make the indicator lamp connected to the trigger module be turned on and the voice broadcast module plays acupoint information of the acupoint block pressed manually.

The central processing unit is configured to interact with the operation panel through the communication module; the operation panel is configured to send an operation signal to the central processing unit, and the central processing unit is further configured to feedback information to the operation panel.

In the integrated teaching system for interaction and examination of ear acupoints, the control system further includes a time-delay circuit, the time-delay circuit is connected to the indicator lamp and a power supply, and the time-delay circuit is configured to control the indicator lamp to be automatically turned off in a delayed manner after being turned on.

In the integrated teaching system for interaction and examination of ear acupoints, the lifting drive part includes a motor disposed on the support frame and a threaded rod rotatably disposed in an inner cavity of the support frame, an end of the threaded rod is fixed to an output shaft of the motor, and another end of the threaded rod is connected to the transmission part.

The threaded rod is threadedly connected with a threaded sleeve, and the threaded sleeve is fixed to an inner wall of the fixing sleeve by a connecting block.

The connecting block passes through a through slot disposed on the support frame and is slidable in the through slot.

In the integrated teaching system for interaction and examination of ear acupoints, the transmission part includes a first transmission shaft and a second transmission shaft both rotatably mounted on a side of the support frame, and the first transmission shaft and the second transmission shaft are rotatably connected by a first transmission belt.

The first transmission shaft is further rotatably connected to a connecting sleeve fixed on the mounting frame by a second transmission belt.

An end of the second transmission shaft away from the first transmission belt is inserted into the inner cavity of the support frame and is rotatably connected to the threaded rod by a bevel gear set.

In the integrated teaching system for interaction and examination of ear acupoints, the gear set includes driving gears fixed on the second connecting shaft and driven gears fixed on the first connecting shaft, and the driving gears are meshed with the driven gears respectively.

The first connecting shaft is fixed to the mounting plate and is rotatably connected to the placement table.

In the integrated teaching system for interaction and examination of ear acupoints, the acupoint blocks on the ear acupoint model on a side of the mounting plate facing away from the placement table are marked with acupoint information, and the acupoint blocks on the ear acupoint model on another side of the mounting plate facing towards the placement table do not be marked with acupoint information.

Compared with the prior art, disclosure has following beneficial effects: The design of the disclosure is novel. The lifting driving part drives the support frame and the whole installed on the support frame to move up to increase its height, and drives the placement table to rotate from a vertical placement state to a horizontal placement state by the transmission part and gear set, while the mounting plate rotates from a state of fitting with the placement table to a state of perpendicular to the placement table, which is convenient for students and teachers to watch and teach. At the same time, the control system of the disclosure cooperates with the ear acupoint models to realize teaching and examining, and the function of the disclosure is strong.

DESCRIPTION OF REFERENCE NUMERALS 1-placement table; 2-mounting plate; 3-ear acupoint model; 4-placement groove; 5-operation panel; 6-driven gear; 7-first connecting shaft; 8-driving gear; 9-second connecting shaft; 10-support frame; 11-fixing sleeve; 12-base; 13-first transmission shaft; 14-first transmission belt; 15-second transmission belt; 16-through slot; 17-motor; 18-threaded sleeve; 19-connecting block; 20-threaded rod; 21-bevel gear set; 22-second transmission shaft; 23-mounting frame; 24-incomplete bevel gear; 25-bevel gear; 26-threaded rod; 27-threaded sleeve; 28-loading plate; 29-connecting rod; 30-acupoint block; 31-elastic element; 32-contacting elastic sheet; 33-rack plate; 34-annular element; 35-damping pad; 36-ratchet wheel; 37-gear; 38-pawl; 39-driving disc.

DETAILED DESCRIPTION OF EMBODIMENTS

In order to make the purpose, technical solutions and advantages of the disclosure clearer, the disclosure will be further described in detail with the attached drawings and embodiments. It should be understood that the specific embodiments described here are only used to explain the disclosure, not to limit the disclosure.

In order to effectively explain the embodiments of the disclosure, the embodiments of the disclosure are described in detail below with reference to the attached drawings.

Please refer to FIGS. 1-5, an integrated teaching system for interaction and examination of ear acupoints in an embodiment of the disclosure includes: a placement table 1 and a mounting plate 2 rotatably mounted on the placement table 1 by a first connecting shaft 7. Each of the two ear acupoint model 3 is provided with seventy-nine acupoint blocks 30, an inner side of each of the acupoint blocks 30 is embedded with an indicator lamp, the indicator lamp is connected to a control system disposed on the mounting plate 2, and the control system is configured to establish communication with an operation panel 5 disposed on the placement table 1. Preferably, a placement groove 4 for placing the operation panel 5 is provided on the loading plate 28, an end of the placement groove 4 is provided with a gap to facilitate the manual removal of the operation panel 5, and the operation panel 5 may be a touch panel or mobile phone, etc. Furthermore, the acupoint blocks 30 on the ear acupoint model 3 on a side of the mounting plate 2 facing away from the placement table 1 are marked with acupoint information, and the acupoint blocks 30 on the ear acupoint model 3 on another side of the mounting plate 2 facing towards the placement table 1 do not be marked with acupoint information. Therefore, during teaching, the mounting plate 2 will be expanded so that the ear acupoint model 3 with acupoint information will face the students, and the teacher and students will be on the same side of the mounting plate 2 for teaching.

In an embodiment, it should be noted that when the acupoint block 30 is pressed manually, the indicator lamp is triggered and be lighted up automatically to facilitate students' observation and learning. At the same time, the indicator lamp on the corresponding acupoint block 30 can be controlled by the operation panel 5 to be lighted up, so that the teacher can be at any position to achieve teaching. Of course, the shape of the ear acupoint model 3 and the corresponding information of the acupoint block 30 will be displayed on the operation tablet 5.

Figure 8:
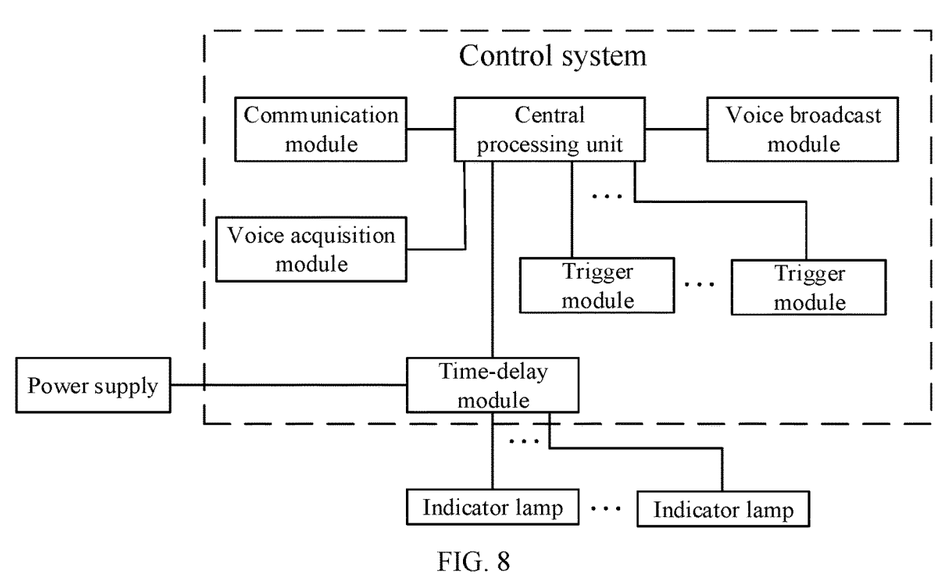
FIG. 8 is a schematic view of detail structures of a control system and a connection of the control system and indicator lamps of the integrated teaching system for interaction and examination of ear acupoints.

As illustrated in FIG. 8, the control system exemplarily includes a central processing unit (also referred to as central processor), trigger modules (also referred to as trigger circuits), a communication module (also referred to as communication circuit), a voice acquisition module (also referred to as voice acquisition circuit) and a voice broadcast module (also referred to as voice broadcast circuit). Specifically, the trigger modules are respectively integrated on the acupoint blocks 30 and are connected to the central processing unit, and each of the trigger modules is configured to be started and send trigger information to the central processing unit when pressing a corresponding one of the acupoint blocks 30 manually. The central processing unit is configured to receive the trigger information and issue instructions to the indicator lamp and the voice broadcast module according to the trigger information, so as to turn on the indicator lamp of a corresponding trigger module and make the voice broadcast module play the acupoint information of the pressed acupoint block 30 pressed manually. The central processing unit is configured to interact with the operation panel 5 through the communication module; the operation panel 5 is configured to send an operation signal to the central processing unit, and the central processing unit is further configured to feedback information to the operation panel 5.

Specifically, the teaching and examining operation can be realized by the control system. In order to understand the disclosure clearer, the disclosure describes this in detail as follows:

When teaching is needed, the teacher can directly press the acupoint block 30 to make the indicator lamp turn on. Students can intuitively view a corresponding position and a corresponding acupoint name through the acupoint information marked on the acupoint block 30. At the same time, the indicator lamp can serve as an indicator. After pressing, the central processing unit also sends an instruction to the voice broadcast module, then the voice broadcast module broadcasts information features of the ear acupoint such as name, position and characteristics, it is convenient for medical staff to learn. At the same time, teachers can also carry out the same operation by the operation panel 5.

When examination is needed, both the teacher and the student are on the side of the ear acupoint model 3 without acupoint information. The teacher presses an ear acupoint on the operation panel 5, and then the indicator lamp on the ear acupoint model 3 lights up, and then the student tells the current acupoint information. The voice acquisition module is configured to obtain the current acupoint information that the student tells and send it to the central processing unit, the central processing unit obtains key words of the current acupoint information that the student tells and compares them with acupoint information of the ear acupoint where the indicator lamp lights up, when the acupoint information that the student tells is correct, the indicator lamp will flash. When the acupoint information that the student tells is wrong, the indicator will automatically turn off, and the operation panel 5 will also display the state of the indicator lamp, so as to judge whether the student's statement is correct or not.

Preferably, the control system further includes a time-delay circuit, the time-delay circuit is connected to the indicator lamp and a power supply, and the time-delay circuit is configured to control the indicator lamp to be automatically turned off in a delayed manner after being turned on. Therefore, when the teacher manually presses the acupoint block 30 or controls the acupoint block 30 by the operation panel 5, the indicator lamp will automatically be turn off after being turned on for a period of time.

The integrated teaching system for interaction and examination of ear acupoints further includes a support frame 10 and a second connecting shaft 9 fixed on the support frame 10, the second connecting shaft 9 is connected to the first connecting shaft 7 by a gear set, the second connecting shaft 9 is rotatably connected to a mounting frame 23 fixed on the placement table 1, an end of the support frame 10 away from the placement table 1 is inserted into a fixing sleeve 11 and is slidable along the fixing sleeve 11, a lifting drive part (also referred to as lifting drive assembly or lifting drive mechanism) is disposed in the support frame 10 and is connected to the fixing sleeve 11, and the lifting drive part is connected to the mounting frame 23 by a transmission part (also referred to as transmission assembly or transmission mechanism). The support frame 10 and other objects on the support frame 10 can be raised and lowered relative to the fixing sleeve 11, and the mounting frame 23 and the placement table 1 are driven by the transmission part to rotate from a vertical position to a horizontal position when the lifting drive part is working, so as to facilitate the teacher's operation. When the placement table 1 rotates from the vertical position to the horizontal position, the gear set drives the mounting plate 2 to rotate and makes the final state of the mounting plate 2 be vertical, so that students can visually see the ear acupoint model 3 on the mounting plate 2.

Figure 3:
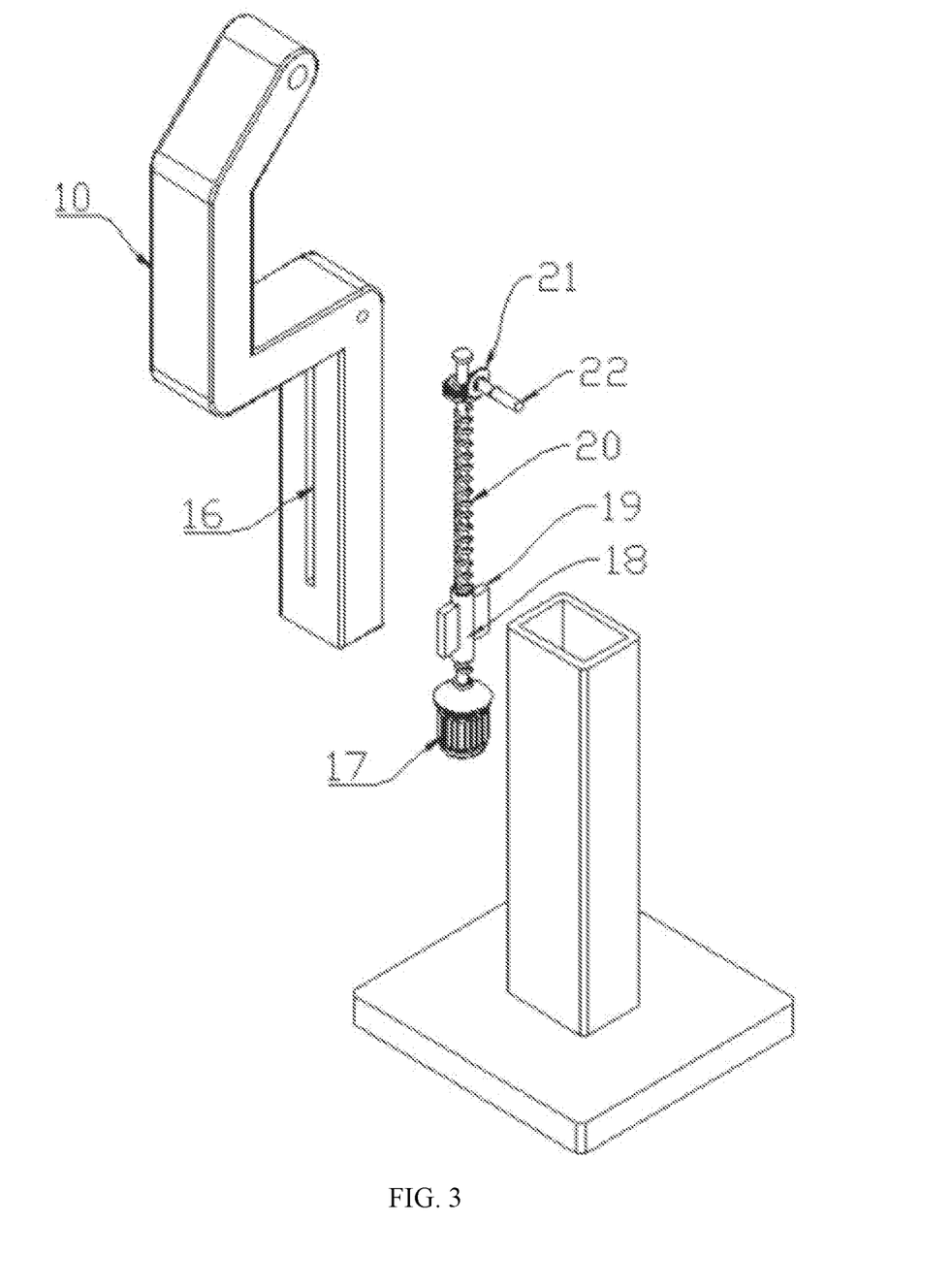
FIG. 3 is a schematic exploded structural view of a lifting drive part and a support frame of the integrated teaching system for interaction and examination of ear acupoints.

Specifically, the lifting drive part includes a motor 17 mounted on the support frame 10 and a threaded rod 20 rotatably mounted in an inner cavity of the support frame 10, an end of the threaded rod 20 is fixed to an output shaft of the motor 17, and another end of the threaded rod 20 is connected to the transmission part. The threaded rod 20 is threadedly connected with a threaded sleeve 18, and the threaded sleeve 18 is fixed to an inner wall of the fixing sleeve 11 by a connecting block 19. The connecting block 19 passes through a through slot 16 disposed on the support frame 10 and is slidable in the through slot 16.

The motor 17 drives the threaded rod 20 to rotate when the motor 17 works. When the threaded rod 20 rotates, the threaded rod 20 drives the threaded sleeve 18 to move along an axial direction of the threaded rod 20, so that the support frame 10 moves relative to the fixing sleeve 11. It should be noted that the connection position between the support frame 10 and the fixing sleeve 11 is arranged in a rectangular structure, and the inner shape of the fixing sleeve 11 matches the shape of the support frame 10, so as to ensure that the support frame 10 cannot rotate relative to the fixing sleeve 11.

In order to increase the overall stability of the disclosure, a base 12 is fixed at the bottom of the fixing sleeve 11, and a through hole is set on the base 12 to facilitate the installation of the motor 17. Preferably, rollers are also installed under the base 12 to facilitate the overall movement of the disclosure.

Figure 4:
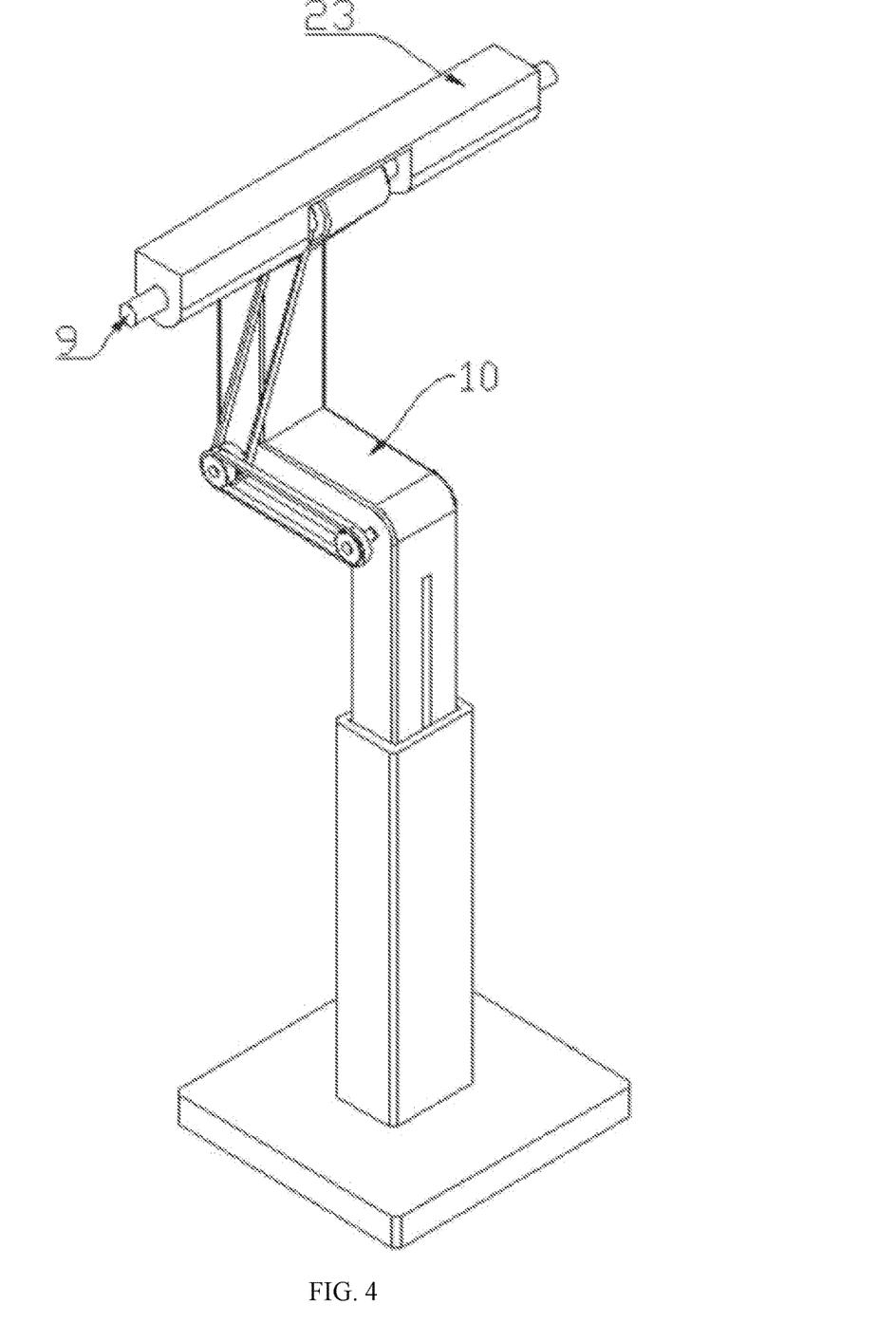
FIG. 4 is a schematic isometric view showing a connection state of the support frame and a fixing sleeve of the integrated teaching system for interaction and examination of ear acupoints.
Figure 5:
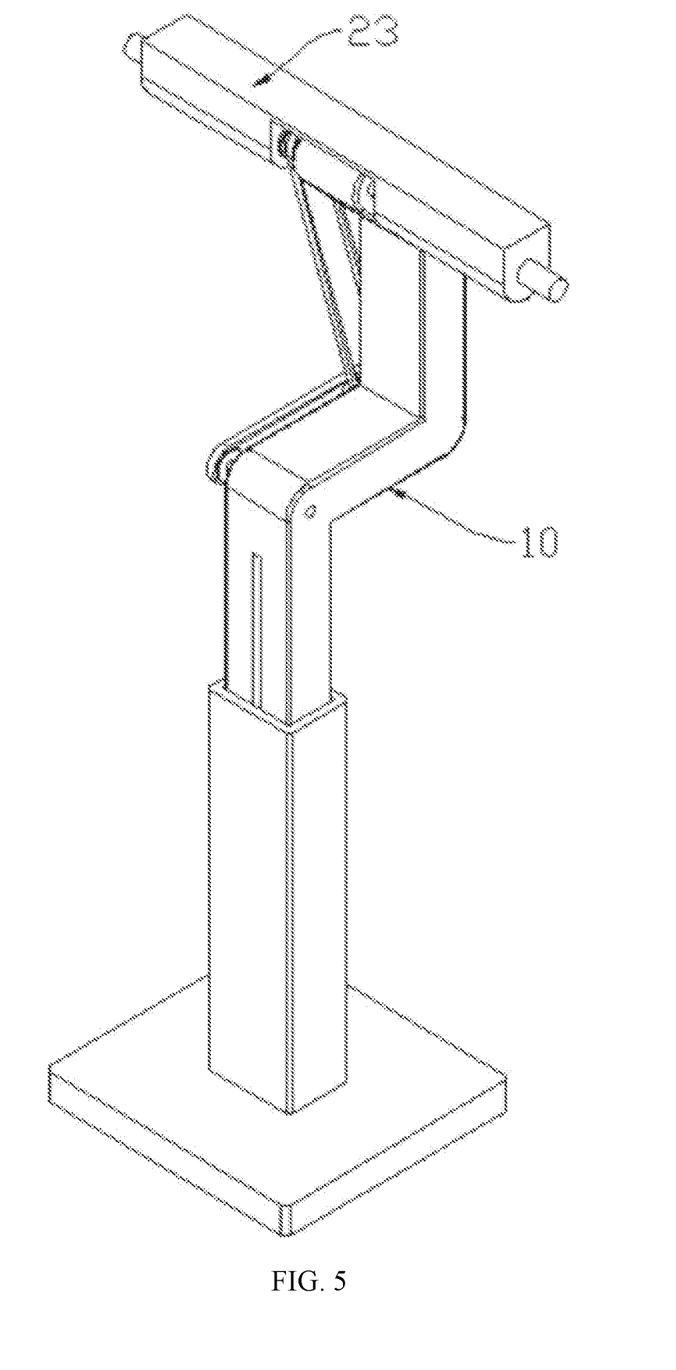
FIG. 5 is a schematic structural view showing a connection state of the support frame and the fixing sleeve of the integrated teaching system for interaction and examination of ear acupoints.

Furthermore, the transmission part includes a first transmission shaft 13 and a second transmission shaft 22 both rotatably mounted on a side of the support frame 10, and the first transmission shaft 13 and the second transmission shaft 22 are rotatably connected by a first transmission belt 14. The first transmission shaft 13 is further rotatably connected to a connecting sleeve fixed on the mounting frame 23 by a second transmission belt 15. An end of the second transmission shaft 22 away from the first transmission belt 14 is inserted into the inner cavity of the support frame 10 and is rotatably connected to the threaded rod 20 by a bevel gear set 21.

When the threaded rod 20 rotates, the threaded rod 20 drives the second transmission shaft 22 to rotate by the action of the bevel gear set 21. The second transmission shaft 22 drives the first transmission shaft 13 to rotate by the action of the first transmission belt 14. When the first transmission shaft 13 rotates, the first transmission shaft 13 drives the mounting frame 23 and the placement table 1 to rotate as a whole by the action of the second transmission belt 15 to meet the transmission requirement. When the support frame 10 moves up, the placement table 1 rotates from the vertical position to the horizontal position, thereby ensuring that the placement table 1 does not occupy large space when not in use.

Furthermore, the bevel gear set 21 consists of two bevel gears that are perpendicular to each other and meshed with each other. The bevel gear set 21 is configured to transmit force in a direction of rotation. Of course, the transmission ratio of the bevel gear set 21 is not specifically limited in this application, and can be selected according to needs.

Figure 1:
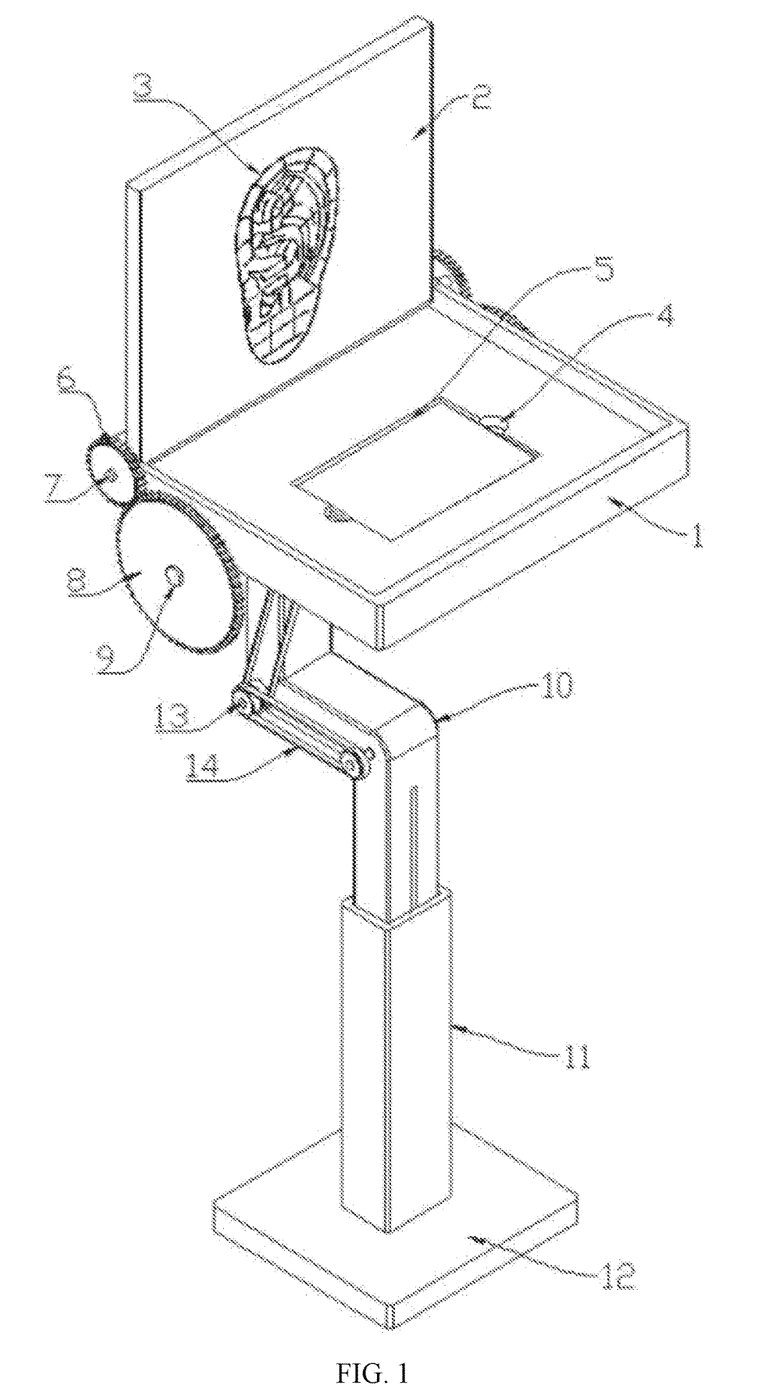
FIG. 1 is a schematic isometric view of an integrated teaching system for interaction and examination of ear acupoints.
Figure 2:
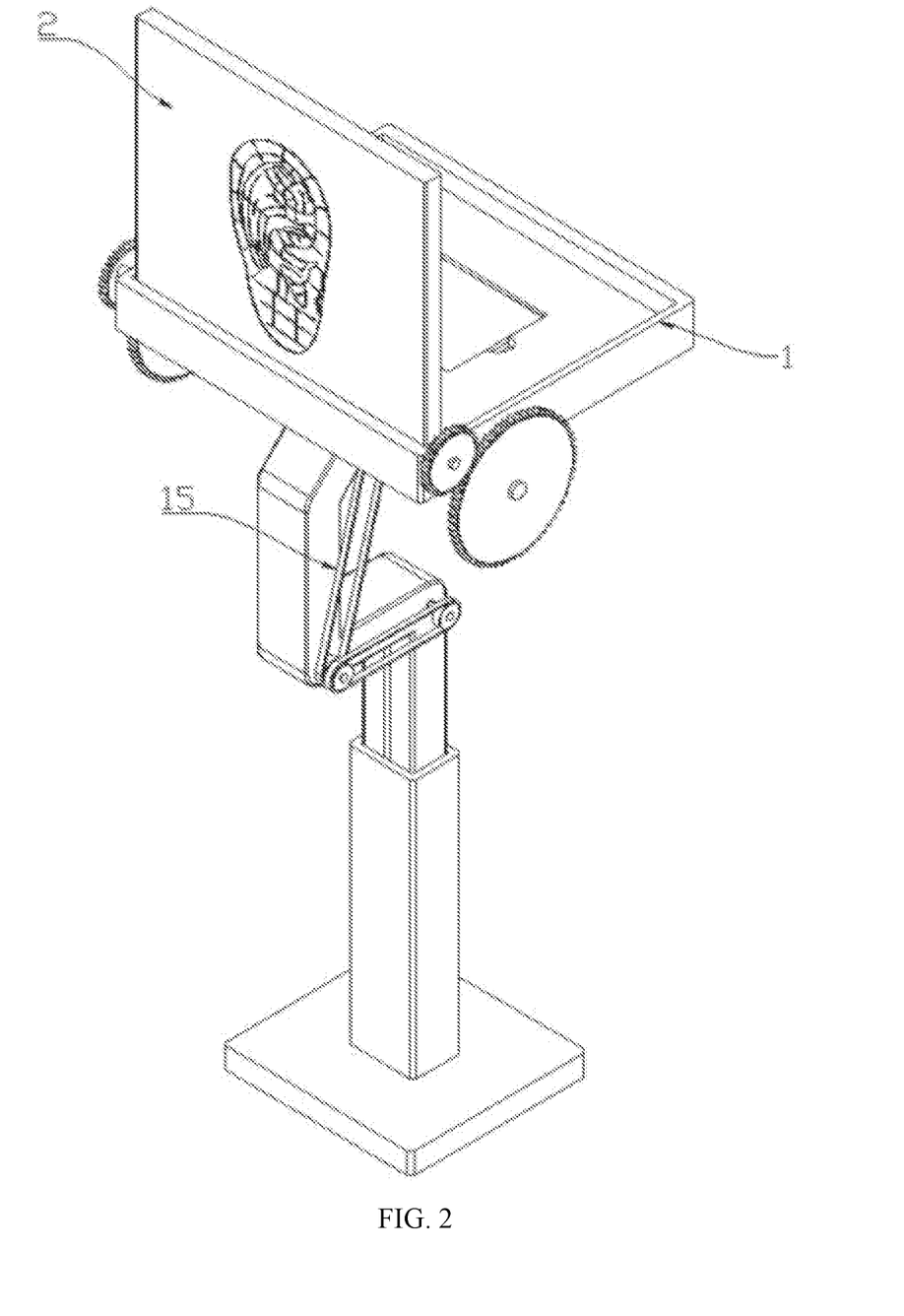
FIG. 2 is a schematic structural view of the integrated teaching system for interaction and examination of ear acupoints.

The gear set includes driving gears 8 fixed on the second connecting shaft 9 and driven gears 6 fixed on the first connecting shaft 7, and the driving gears 8 are meshed with the driven gears 6 respectively. The first connecting shaft 7 is fixed to the mounting plate 2 and is rotatably connected to the placement table 1. The driving gear 8 does not rotate relative to the support frame 10, and the driven gear 6 rotates around the driving gear 8, so that the mounting plate 2 rotates. In the initial state, the mounting plate 2 fits with the placement table 1. When in use, the placement table 1 rotates from the vertical position to the horizontal position, while the mounting plate 2 rotates from the position that fits with the placement table 1 to the position that is perpendicular to the placement table 1. The transmission ratio between the driving gear 8 and the driven gear 6 is not specifically described in this application, but can be selected in the specific implementation process.

Figure 6:
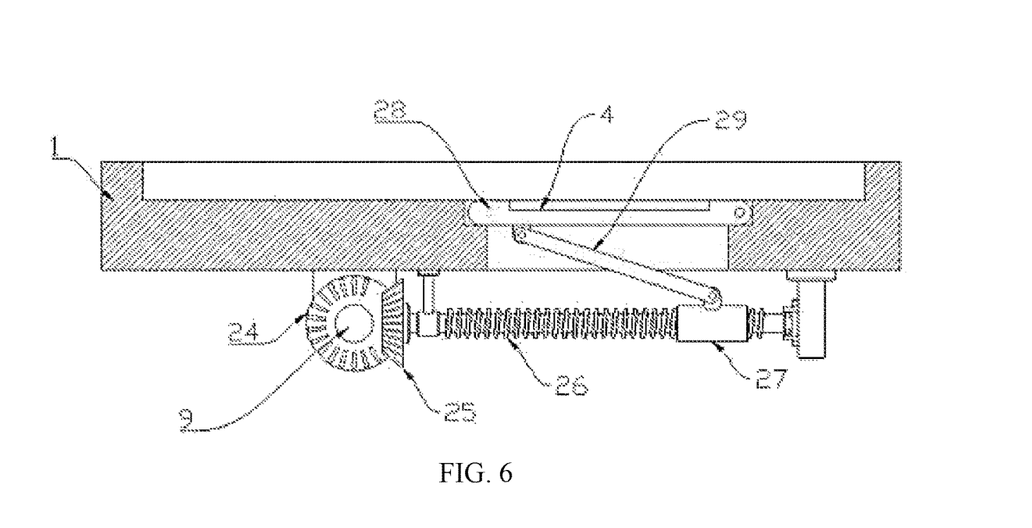
FIG. 6 is a schematic view showing a connection state of a loading plate and a threaded rod of the integrated teaching system for interaction and examination of ear acupoints.

In an embodiment of the disclosure, please refer to FIG. 6, a loading plate 28 is rotatably disposed on the placement table 1, and a placement groove 4 for placing the operation panel 5 is provided on the loading plate 28.

When the placement table 1 is placed vertically, the teeth on the bevel gear 25 do not mesh with the toothed part on the incomplete bevel gear 24. When the bevel gear 25 rotates 30° or 45° with the placement table 1 as a whole, the bevel gear 25 meshes with the toothed part of the incomplete bevel gear 24, thus realizing the rotation of the bevel gear 25. When the bevel gear 25 rotates, the bevel gear 25 drives the threaded rod 20 to rotate, and the threaded rod 20 drives the loading plate 28 to rotate by the action of the threaded sleeve 27 and the connecting rod 29, so that the loading plate 28 can rotate from a placing state parallel to the placement table 1 to a tilting state, which is convenient for the teacher to view or control the operation panel 5.

It should be noted that in the initial state, the teeth on the bevel gear 25 do not mesh with the toothed part on the incomplete bevel gear 24, which can make the loading plate 28 rotate after the mounting plate 2 rotates a certain angle relative to the placement table 1, and prevent the rotation of the loading plate 28 from interference of the mounting plate 2.

Figure 7:
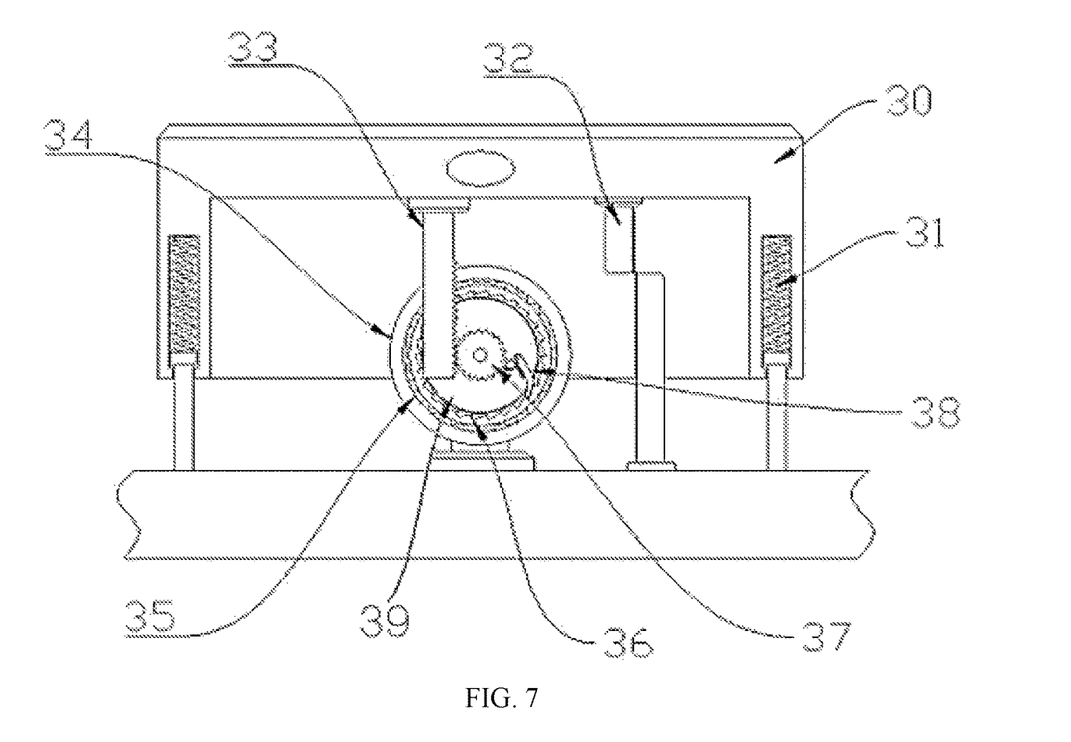
FIG. 7 is a schematic view showing a connection state of an acupoint block and a mounting plate of the integrated teaching system for interaction and examination of ear acupoints.

In an embodiment of the disclosure, please refer to FIG. 7, the acupoint block 30 is connected to the mounting plate 2 by elastic elements 31, a rack plate 33 is fixed to a side of the acupoint block 30 facing towards the mounting plate 2, and the rack plate 33 is meshed with a gear 37 rotatably mounted on the mounting plate 2. A driving disc 39 is fixed on a rotating shaft of the gear 37, a ratchet wheel 36 is disposed around the driving disc 39, the ratchet wheel 36 is matched with a pawl 38 mounted on the driving disc 39, an annular element 34 is fixed to the mounting plate 2 and disposed around the ratchet wheel 36, and a damping pad 35 is disposed between the annular element 34 and the ratchet wheel 36.

When the acupoint block 30 is pressed, the acupoint block 30 moves towards the mounting plate 2 and presses the elastic elements 31. When the acupoint block 30 moves towards the mounting plate 2, the acupoint block 30 drives the rack plate 33 to move. When the rack plate 33 moves, the rack plate 33 drives the gear 37 to rotate. At this time, due to the action of the ratchet wheel 36 and the pawl 38, the driving disc 39 rotates while the ratchet wheel 36 does not rotate, so that the force required in pressing the acupoint block 30 is small. When the pressure applied on the elastic elements is removed, the acupoint block 30 is reset under the action of the elastic elements 31, and then the gear 37 rotates in a reverse direction under the action of the rack plate 33, and the gear 37 cooperates with the pawl 38 to drive the ratchet wheel 36 to rotate. Since the damping pad 35 is disposed between the ratchet wheel 36 and the annular element 34, the ratchet 36 rotates slowly to realize the slow reset of the acupoint block 37.

In an embodiment, it should be noted that two contacting elastic sheets 32 are disposed between the acupoint block 30 and the mounting plate 2, and opposite faces of the two contacting elastic sheets 32 are provided with conductive elements. When the acupoint block 30 moves towards the mounting plate 2, the conductive elements on the two contacting elastic sheets 32 contact to each other to achieve conduction, so that the indicator lamp will be lighted up. At the same time, the acupoint block 30 slowly resets, and thus the indicator lamp can be turned off after a certain time.

To sum up, the design of the disclosure is novel. The lifting driving part drives the support frame 10 and the whole installed on the support frame 10 to move up to increase its height, and drives the placement table 1 to rotate from a vertical placement state to a horizontal placement state by the transmission part and gear set, while the mounting plate 2 rotates from a state of fitting with the placement table 1 to a state of perpendicular to the placement table 1, which is convenient for students and teachers to watch and teach. At the same time, the control system of the disclosure cooperates with the ear acupoint models 3 to realize teaching and examining, and the function of the disclosure is strong.

For those skilled in the art, it is apparent that the disclosure is not limited to the details of the above exemplary embodiments, and can be realized in other specific forms without departing from the spirit or basic features of the disclosure. Therefore, from any point of view, the embodiments should be regarded as exemplary and non-restrictive. The scope of the disclosure is limited by the appended claims rather than the above description. Therefore, it is intended to include all changes falling within the meaning and scope of the equivalent elements of the claims in the disclosure. Any reference mark in the claims shall not be regarded as a limit to the claims involved.

In addition, it should be understood that although this specification is described in accordance with the embodiments, not each embodiment only contains an independent technical solution. This description of the specification is only for the sake of clarity. Those skilled in the art should take the specification as a whole, and the technical solutions in each embodiment can also be properly combined to form other embodiments that can be understood by those skilled in the art.

What is claimed is:

1. An integrated teaching system for interaction and examination of ear acupoints, comprising:
   a placement table (1), and a mounting plate (2) rotatably mounted on the placement table (1) by a first connecting shaft (7);
   wherein two ear acupoint models (3) are symmetrically mounted on two sides of the mounting plate (2);
   wherein the integrated teaching system further comprises a support frame (10) and a second connecting shaft (9) fixed on the support frame (10), the second connecting shaft (9) is connected to the first connecting shaft (7) by a gear set, the second connecting shaft (9) is rotatably connected to a mounting frame (23) fixed on the placement table (1), an end of the support frame (10) away from the placement table (1) is inserted into a fixing sleeve (11) and is slidable along the fixing sleeve (11), a lifting drive part is disposed in the support frame (10) and is connected to the fixing sleeve (11), and the lifting drive part is connected to the mounting frame (23) by a transmission part;
   wherein each of the two ear acupoint model (3) is provided with seventy-nine acupoint blocks (30), an inner side of each of the acupoint blocks (30) is embedded with an indicator lamp, the indicator lamp is connected to a control system disposed on the mounting plate (2), and the control system is configured to establish communication with an operation panel (5) disposed on the placement table (1);

wherein the lifting drive part comprises a motor (17) mounted on the support frame (10) and a first threaded rod (20) rotatably mounted in an inner cavity of the support frame (10), an end of the first threaded rod (20) is fixed to an output shaft of the motor (17), and another end of the first threaded rod (20) is connected to the transmission part;

wherein the first threaded rod (20) is threadedly connected with a threaded sleeve (18), and the threaded sleeve (18) is fixed to an inner wall of the fixing sleeve (11) by a connecting block (19);

wherein the connecting block (19) passes through a through slot (16) disposed on the support frame (10) and is slidable in the through slot (16);

wherein the transmission part comprises a first transmission shaft (13) and a second transmission shaft (22) both rotatably mounted on a side of the support frame (10), and the first transmission shaft (13) and the second transmission shaft (22) are rotatably connected by a first transmission belt (14);

wherein the first transmission shaft (13) is further rotatably connected to a connecting sleeve fixed on the mounting frame (23) by a second transmission belt (15); and wherein an end of the second transmission shaft (22) away from the first transmission belt (14) is inserted into the inner cavity of the support frame (10) and is rotatably connected to the first threaded rod (20) by a bevel gear set (21).

2. The integrated teaching system for interaction and examination of ear acupoints according to claim 1, wherein the control system comprises a central processing unit, trigger circuits, a communication circuit, a voice acquisition circuit and a voice broadcast circuit;

wherein the trigger circuits are integrated on the acupoint blocks (30) respectively and are connected to the central processing unit, and each of the trigger circuits is configured to be started and send trigger information to the central processing unit when pressing a corresponding one of the acupoint blocks (30) manually;

wherein the central processing unit is configured to receive the trigger information and issue instructions to the indicator lamp and the voice broadcast circuit according to the trigger information, to make the indicator lamp connected to the trigger circuit be turned on and the voice broadcast circuit play acupoint information of the acupoint block (30) pressed manually; and wherein the central processing unit is configured to interact with the operation panel (5) through the communication circuit, the operation panel (5) is configured to send an operation signal to the central processing unit, and the central processing unit is further configured to feedback information to the operation panel (5).

3. The integrated teaching system for interaction and examination of ear acupoints according to claim 2, wherein the control system further comprises a time-delay circuit, the time-delay circuit is connected to the indicator lamp and a power supply and configured to control the indicator lamp to be automatically turned off in a delayed manner after being turned on.

4. The integrated teaching system for interaction and examination of ear acupoints according to claim 1, wherein the gear set comprises driving gears (8) fixed on the second connecting shaft (9) and driven gears (6) fixed on the first connecting shaft (7), and the driving gears (8) are meshed with the driven gears (6) respectively; and wherein the first connecting shaft (7) is fixed to the mounting plate (2) and is rotatably connected to the placement table (1).

5. The integrated teaching system for interaction and examination of ear acupoints according to claim 1, wherein the acupoint blocks (30) on the ear acupoint model (3) on a side of the mounting plate (2) facing away from the placement table (1) are marked with acupoint information, and the acupoint blocks (30) on the ear acupoint model (3) on another side of the mounting plate (2) facing towards the placement table (1) do not be marked with acupoint information.

6. The integrated teaching system for interaction and examination of ear acupoints according to claim 1, wherein a loading plate (28) is rotatably mounted on the placement table (1), and a placement groove (4) for placing the operation panel (5) is provided on the loading plate (28); and wherein a second threaded rod (26) is rotatably mounted on the placement table (1), a bevel gear (25) is fixed to an end of the second threaded rod (26), the bevel gear (25) is matched with an incomplete bevel gear (24) fixed on the second connecting shaft (9), a threaded sleeve (27) is threadedly connected with the second threaded rod (26), and the threaded sleeve (27) is hinged with the loading plate (28) by a connecting rod (29) hinged with the threaded sleeve (27).

7. The integrated teaching system for interaction and examination of ear acupoints according to claim 1, wherein each of the acupoint blocks (30) is connected to the mounting plate (2) by elastic elements (31), a rack plate (33) is fixed to a side of the acupoint block (30) facing towards the mounting plate (2), and the rack plate (33) is meshed with a gear (37) rotatably mounted on the mounting plate (2); and wherein a driving disc (39) is fixed on a rotating shaft of the gear (37), a ratchet wheel (36) is disposed around the driving disc (39), the ratchet wheel (36) is matched with a pawl (38) mounted on the driving disc (39), an annular element (34) is fixed to the mounting plate (2) and disposed around the ratchet wheel (36), and a damping pad (35) is disposed between the annular element (34) and the ratchet wheel (36).

* * * * *